United States Patent [19]

Bowman

[11] 4,361,224

[45] Nov. 30, 1982

[54] ROLLER MOTION SENSING ACCUMULATOR

[75] Inventor: Clyde Bowman, Grand Rapids, Mich.

[73] Assignee: Lear Siegler, Inc., Grand Rapids, Mich.

[21] Appl. No.: 150,820

[22] Filed: May 19, 1980

[51] Int. Cl.³ .............................................. B65G 13/07
[52] U.S. Cl. .................................... 198/781; 198/790; 198/809
[58] Field of Search ............... 198/781, 790, 809, 460

[56] References Cited

U.S. PATENT DOCUMENTS

3,854,576 12/1974 Bowman ..................... 198/781 X

Primary Examiner—Jeffrey V. Nase
Attorney, Agent, or Firm—Price, Heneveld, Huizenga & Cooper

[57] ABSTRACT

This invention relates to accumulator conveyors. During the past two decades many types of accumulator conveyors have been developed. These utilize a variety of different operating mechanisms and principles. This invention is in the field of accumulator conveyors which rely upon shifting the primary propelling member vertically between a raised position in which the propelling member is in driving contact with the lower faces of the article supporting and propelling rollers and a lowered position in which it is disengaged from these rollers. The invention is further directed to the type of accumulator in which the shift of the conveyor from conveying to accumulation mode and return to conveying mode is automatically controlled in response to the presence of the motion or lack of motion of an article on the conveyor. Heretofore, all conveyors of this type have had some type of sensor in the form of a roller, lever, wheel or pneumatic valve which is moved or triggered by an article near or over it. It is a common characteristic of these accumulators that most of them will not close-pack the articles as they are accumulated and they have the characteristic of significantly spacing or singulating the articles as they are released from accumulation. While these are desirable characteristics under certain circumstances, there are many applications in which the efficiency of the conveyor could be improved if these characteristics were eliminated because it would increase the throughput of the conveyor for a given length and belt speed.

20 Claims, 20 Drawing Figures

ROLLER MOTION SENSING ACCUMULATOR

BRIEF DESCRIPTION OF THE INVENTION

This invention provides an accumulator which has no sensor of the conventional type. The shift from conveying to accumulation mode and the return from accumulation to conveying mode is controlled by a sensing belt. The belt does not sense the presence of an article but rather it senses the fact that the article supporting and conveying rollers are held against rotation by a stalled article.

The invention employs belt support units, several of which form an operating group with the groups arranged in tandem along the length of the conveyor. Under normal conveying circumstances, all of the operating groups will be functioning in conveying mode with the result that articles will continuously move along the conveyor. However, should an article become stalled, this will result in the rollers beneath that article being frictionally held against rotation. This will be sensed by a sensing belt which itself becomes stalled and transmits this fact to the upstream support unit of the next upstream operating group. This upstream support unit is interconnected by a belt drive means to all of the support units except one in the next upstream operating group. The one it is not connected to is the last upstream support unit which corresponds in that group to the one connected to the stalled sensing belt. The stalling of the sensing belt will result in release of the driving connection between the primary propelling member or driving belt above all of the support units interconnected to it. This termination of the drive to the adjacent support units of the next upstream group will cause the articles entering the zone controlled by that upstream group to lose conveying power and become stationary behind the first article. This pattern of operation repeats progressively upstream of the conveyor as more and more articles are accumulated on the conveyor.

DESCRIPTION OF THE PREFERRED EMBODIMENT

As herein used, the terms "upstream" and "downstream" are used in relation to the direction of movement of the articles along the conveyor. This is opposite to the direction of movement of the drive belt in a powered roller conveyor and in the same direction as the belt in a wheel conveyor.

A powered roller, accumulator conveyor is disclosed in which the article propelling rollers are driven from beneath by a belt. This is the primary driving belt. The primary belt is supported at spaced intervals by support units each having four wheels arranged on a common shaft. The wheels of the support unit provide vertical position control for the primary driving belt.

A portion of the circumferential surface of all four wheels has a reduced radius to provide a rest or flattened area. The support units are arranged in operating groups arranged in tandem along the accumulator. Associated with the groups are operating zones each of which overlaps two adjacent zones. Each operating group has a sensing belt along one side of and parallel to the powered propelling belt. The sensing belt also extends upstream to make driving connection with the downstream support unit of the next upstream operating group. The sensing belt is permanently held in driven contact with the article propelling rollers above it. This belt is connected to only the last upstream support unit of the operating group with which it is associated. This connection is a lost motion, rotary connection. The sensing belt is, however, in contact with the conveyor rollers above its associated operating group.

The four wheels of each support unit consist of an inner couple or pair integrally connected and a pair of outer single wheels. Each outer single wheel is connected to the inner wheel couple by a lost motion clutch. This allows the outer wheels to arrange their flat surfaces in an out-of-phase relationship to each other and to the flat surfaces of the wheels of the inner couple when the conveyor is in conveying mode and to rearrange themselves into an in-phase relationship, with their flat surfaces up, when in accumulation mode. All but the upstream one of the inner wheel couples of each operating group are interconnected for simultaneous operation. These are also connected to the inner wheel couple of the last upstream support unit of the next downstream operating group. The interconnection of these inner wheel couples is made by secondary drive belts. The support units subtended by a sensing belt constitute an operating group which the support units operatively interconnected by secondary drive constitute an operating zone.

Cessation of movement of an article above one group stops rotation of the article supporting conveyor rollers, thus terminating power to the sensing belt contacting these rollers. Since this terminates drive to the upstream one of the support units of the operating group beneath, it also results in termination of drive to the drive belt connected to the downstream support units of the next upstream operating group. This causes the wheels of the support units of the upstream group to become stationary with their flattened areas up, dropping the belt into non-drive or accumulation position with respect to the conveyor rollers above.

Figures 1, 2, 20:
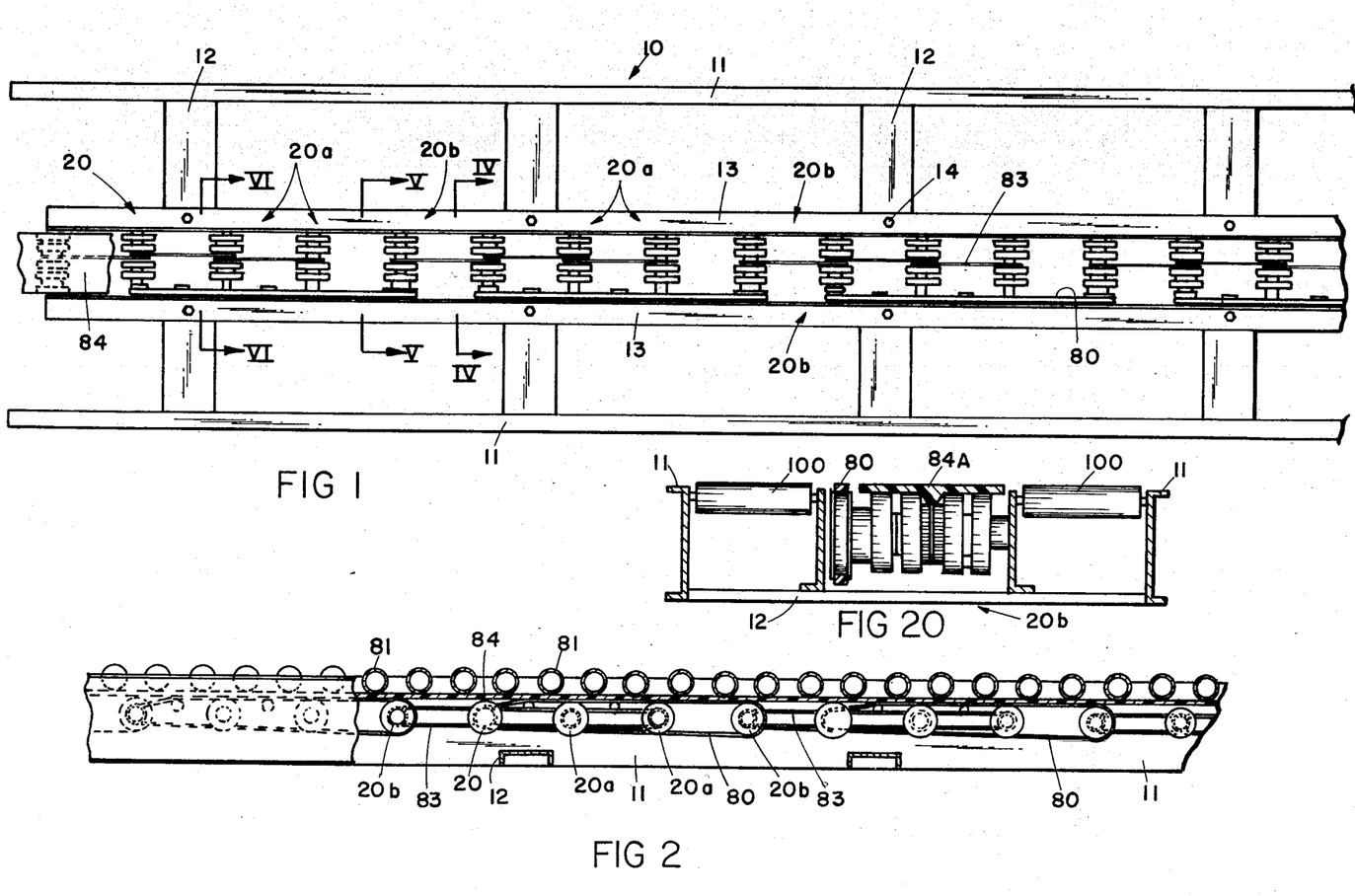
FIG. 1 is a fragmentary, plan view of an accumulation conveyor equipped with this invention with only a fragmentary showing of the belt and the conveying rollers omitted for clarity.
FIG. 2 is a partially sectional, side elevational view of the conveyor illustrated in FIG. 1.
FIG. 20 is a sectional elevational view taken along the plane XX—XX of FIG. 19.
Figure 5:
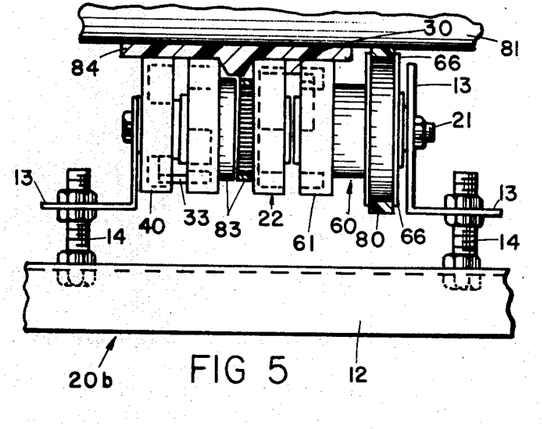
FIG. 5 is a sectional elevational view taken along the plane V—V of FIG. 1.

Now referring to FIG. 1, the numeral 10 refers to a conveyor having a pair of spaced side frame members 11 joined at suitable intervals by cross members 12. Extending lengthwise of the conveyor are a pair of laterally spaced, L-shaped stringers 13 forming a central medial lane along the conveyor. While this lane is illustrated as centered in the conveyor, this is not essential. The stringers 13 are supported on the cross members 12. Their vertical position can be adjusted by suitable means such as the threaded studs 14 (FIG. 5).

At uniformly spaced intervals, support units are mounted between the stringers 13. These support units are of three types, designated as 20, 20a and 20b. Each support unit has an axle 21 which, between the stringers 13, mounts a central, inner wheel couple 22. This structure is the same for all three types of support units 20, 20a and 20b.

Figure 10:
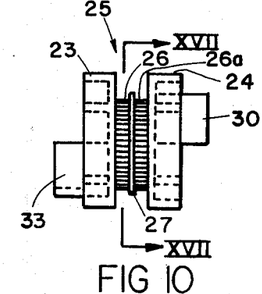
FIG. 10 is an elevational view of the inner wheel couple of a support unit.
Figure 17:
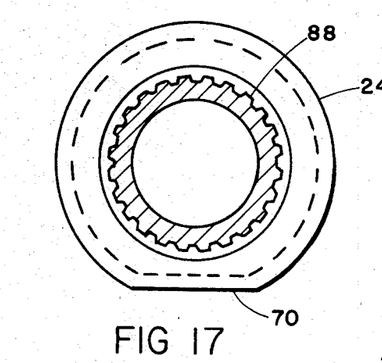
FIG. 17 is an enlarged, sectional view taken along the plane XVII—XVII of FIG. 10.

The wheel pair 22, as best seen in FIGS. 10 and 17, consists of a pair of wheels 23 and 24 which are spaced apart to form a central channel 25. The central channel 25 is divided into a pair of sprocket pulleys 26 and 26a, separated from each other by a radially extending flange 27. The purpose of this construction will be explained subsequently.

Figure 11:
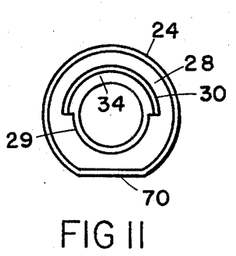
FIG. 11 is an end view of the right hand end of the wheel couple shown in FIG. 10.

The outer face of the wheel 24 is recessed at 28, as is indicated in FIG. 11. Concentric within the recess 28 is an axially extending annular wall 29 from one portion of which an axially extending clutch finger 30 projects substantially beyond the outer face of the wheel. The clutch finger 30 is a semicircular shell subtending an arc of 180°.

The construction of the wheel 23 is quite similar to that of the wheel 24 and has a recess 31 in its outer face equipped with an inner annular wall 32 from which a clutch finger 33 projects axially substantially beyond the outer face of the wheel. Again, the clutch finger 33 is a circular shell subtending 90° of arc. It will be observed from FIGS. 11 and 12 that the clutch fingers 30 and 33 are radially offset outwardly from the radial outer face of the walls 29 and 32. The walls 29 and 32 form the hubs for the inner wheel couple. This creates a circumferential passage 34 in the case of the wheel 24 and a circumferential passage 35 in the case of the wheel 23. It will be observed from FIG. 10 that the axial length of the outer peripheral shell of the wheel and that of the inner walls or hubs in the case of both the wheels 23 and 24, are in the same plane.

Figure 4:
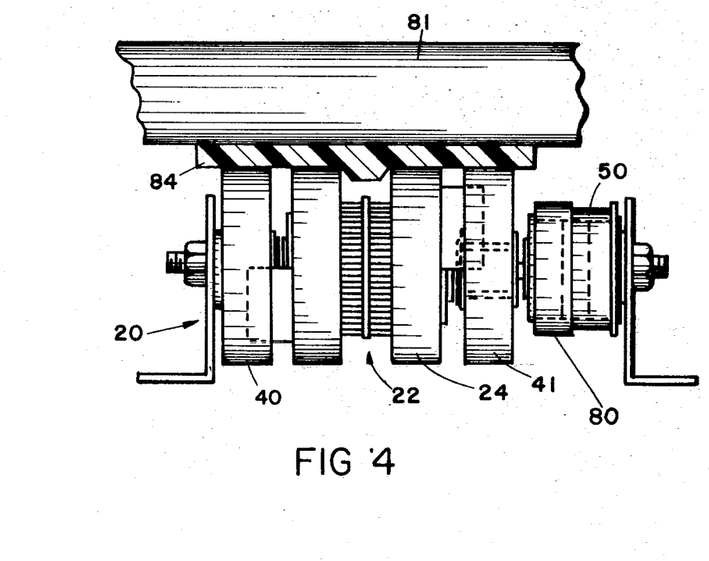
FIG. 4 is a sectional, elevational view taken along the plane IV—IV of FIG. 1.

The downstream support unit 20 (FIG. 4) of each operating group, in addition, has a pair of end wheels 40 and 41 at opposite ends of the inner wheel couple 22. The inner wheel couple 22 and the two outer wheels 40 and 41 are all freely rotatable on the shaft 21.

Figure 16:
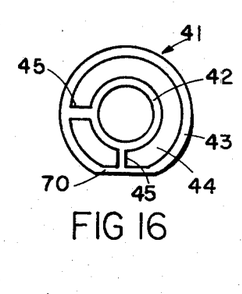
FIG. 16 is an end view of the inner end of the wheel shown in FIG. 15.

The inner face of the outer wheel 41 has an axially projecting annular central hub 42 of the same diameter as the hub 29 of the wheel 24 (FIG. 16). Between the inner hub wall 42 and the peripheral wall 43 is a circular channel 44 which receives the clutch finger 30. The channel 44 subtends 270° of arc and has a stop 45 at each end to limit the relative rotational movement between the outer wheel 41 and the inner wheel couple 22. The combination of the channel 44 and the clutch finger 30 provides a lost motion connection or a clutch with limited rotational slippage.

Figure 13:
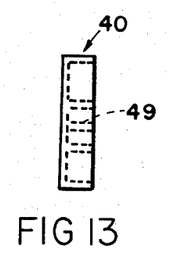
FIG. 13 is an elevational view of the outer wheel at the left hand end of the support unit as illustrated in FIG. 5.
Figure 14:
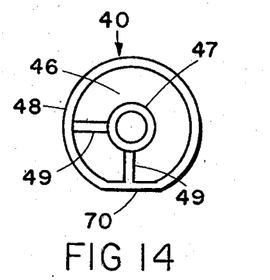
FIG. 14 is an end view of the inner end of the wheel shown in FIG. 13.
Figure 15:
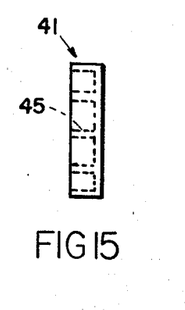
FIG. 15 is an elevational view of the outer wheel at the right hand end of the support unit illustrated in FIGS. 4 and 6.

The second outer wheel 40 also has a channel 46 subtending an arc of 270° for receiving the clutch finger 33 (FIGS. 13 and 14). This channel is between the inner hub 47 and the outer peripheral wall 48 of the wheel. The opposite ends of the channel have radially extending webs forming stops 49. The combination of the channel 46 and the finger 33 provides a lost motion connection or a clutch having limited rotational slippage.

Adjacent the outer wheel 41, an idler pulley 50 is mounted for free rotation about the shaft 21. The idler pulley is of substantially smaller diameter than the wheels 23, 24, 40 and 41.

The end wheels 40 and 41, the inner wheel couple 22 and the idler pulley 50 preferably are all mounted on the shaft by suitable bearings such as ball bearings press fitted into their hubs.

Figure 6:
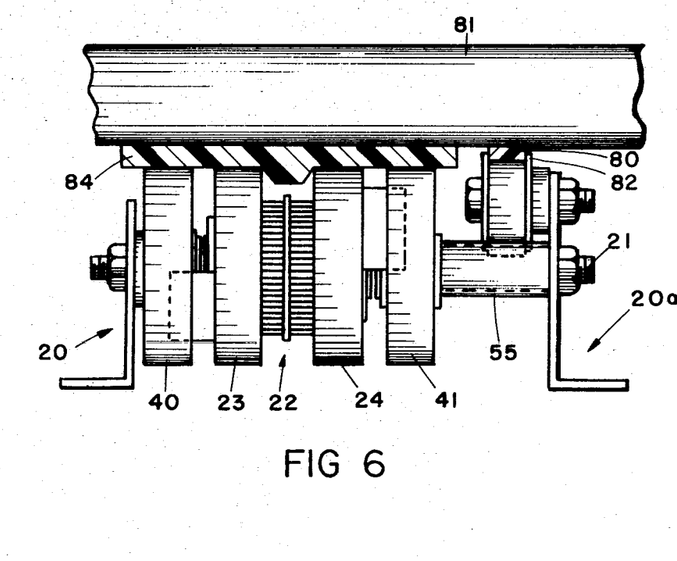
FIG. 6 is a sectional, elevational view taken along the plane VI—VI of FIG. 1.

The intermediate support unit 20a is illustrated in FIG. 6. That part of its structure which is identical to the downstream support unit 20 has the same identifying numbers. Thus, it has a shaft 21, an inner wheel couple 22 and end wheels 40 and 41. However, the idler pulley 50 is replaced by a tubular sleeve 55 which serves as a spacer to maintain the position of the wheels.

The upstream support unit 20b is illustrated in FIG. 5. That part of its structure which is identical to the downstream support unit 20 has the same identifying numbers. Thus, it has a shaft 21, an inner coupler 22 and an end wheel 40. However, the other end wheel 41 is replaced with a coupling member 60.

Figure 9:
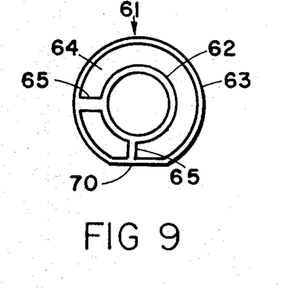
FIG. 9 is an end view of the inner end of the wheel shown in FIG. 7.

The inner end of the coupling member is formed into a wheel portion 61 identical in construction to the outer wheel 41 illustrated in FIG. 16. The inner face of the wheel portion 61 of the coupling member 60 has an axially projecting, ring-like central hub 62 of the same diameter as the ring-like hub 29 of the wheel 24 (FIG. 9). Between the inner hub wall 62 and the outer peripheral wall 63 is a circular channel 64 which receives the clutch finger 30. The channel 64 subtends 270° of arc and has a stop 65 at each end to limit the relative rotational movement between the coupling member 60 and the inner wheel pair 22. This arrangement provides a lost motion connection or clutch with limited rotational slippage.

Figure 7:
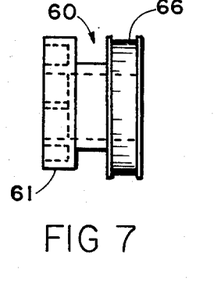
FIG. 7 is an elevational view of the sensor belt pulley and outer belt support wheel shown at the right hand end of FIG. 5.
Figure 8:
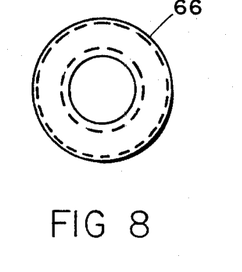
FIG. 8 is an end view of the outer end of the wheel shown in FIG. 7.

Spaced outwardly from the wheel portion 61, the coupling member 60 has a belt pulley 66 which, as shown in FIG. 7, is recessed slightly on its periphery to receive the sensing belt hereinafter described. The diameter of the belt pulley 66 is somewhat greater than that of the wheel portion 61 of the coupling member.

Figure 12:
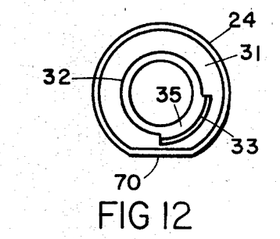
FIG. 12 is an end view of the left hand end of the wheel couple shown in FIG. 10.

Each of the wheels 23, 24, 40 and 41 and the wheel portion 61 has a rest or flattened portion 70 on its periphery. This is formed by a segment of reduced radius. In the case of the wheels 23 and 24 of the inner wheel couple 22, the rest or flattened portions 70 are aligned with each other axially of the unit whereby they are in the identical circumferential position. However, in the case of the wheel 24, the rest 70 is diametrically opposite from and centered about the clutch finger 30 (FIG. 11). In the case of the wheel 23, the rest 70 is adjacent to and centered about one end of the clutch finger 33 (FIG. 12). In the case of both of the outer wheels 40 and 41 and of the wheel portion 61, the rest portions 70 are centered about one of the stops. This arrangement permits the flattened portions 70 of the outer wheels to be out-of-phase, that is, shifted circumferentially at least 90° from the rest 70 of the inner wheels. However, when either the coupling member 60 or the inner wheel couple is held against rotation, the result will be to bring the rests 70 of all of the wheels into phase, thus, aligning them to form a continuous plane across all four wheels of the support unit. The principles of this type of eccentric belt support for an accumulator are disclosed in U.S. Pat. No. 3,854,576 entitled "Eccentric Wheel Accumulators" issued Dec. 17, 1974.

The support units 20, 20a and 20b are arranged in operating groups. The number of support units in each group is dependent upon the length or size of the articles to be accumulated. The longer the articles, the more support units provided in each operating group since the number of support units in each group determines the length of the zone of operation of the accumulator. The minimum number of support units comprising an operating group is three. For purposes of illustration, each operating group consists of four support units. In each operating group as thus disclosed, there is a downstream support unit 20 (FIG. 4), a pair of intermediate support units 20a (FIG. 6) and an upstream support unit 20b (FIG. 5).

Figure 3:
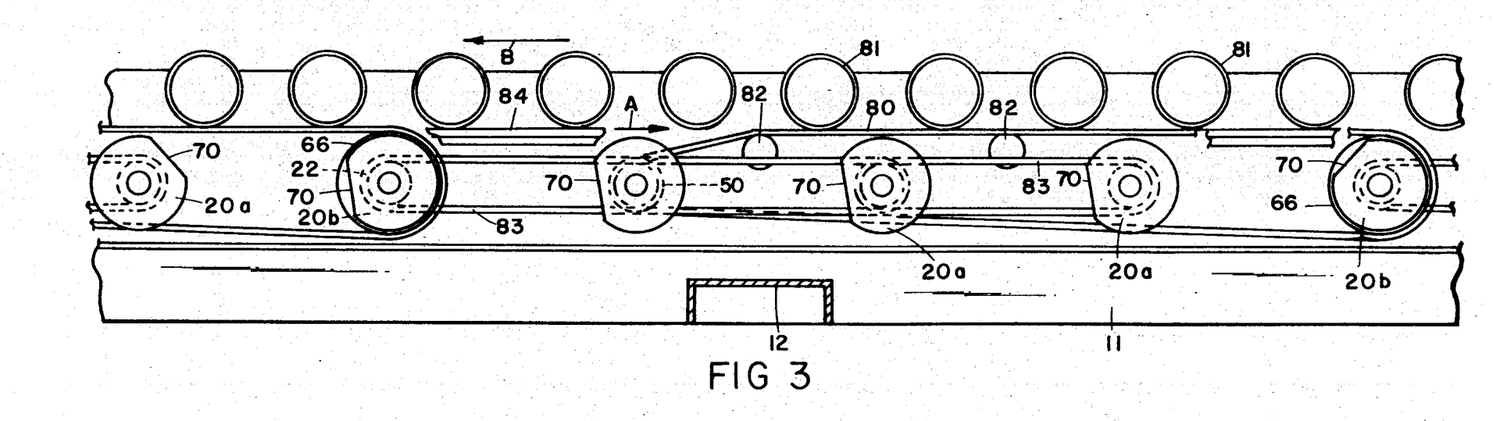
FIG. 3 in an enlarged, fragmentary view of a portion of a conveyor equipped with this invention.
Figure 18:
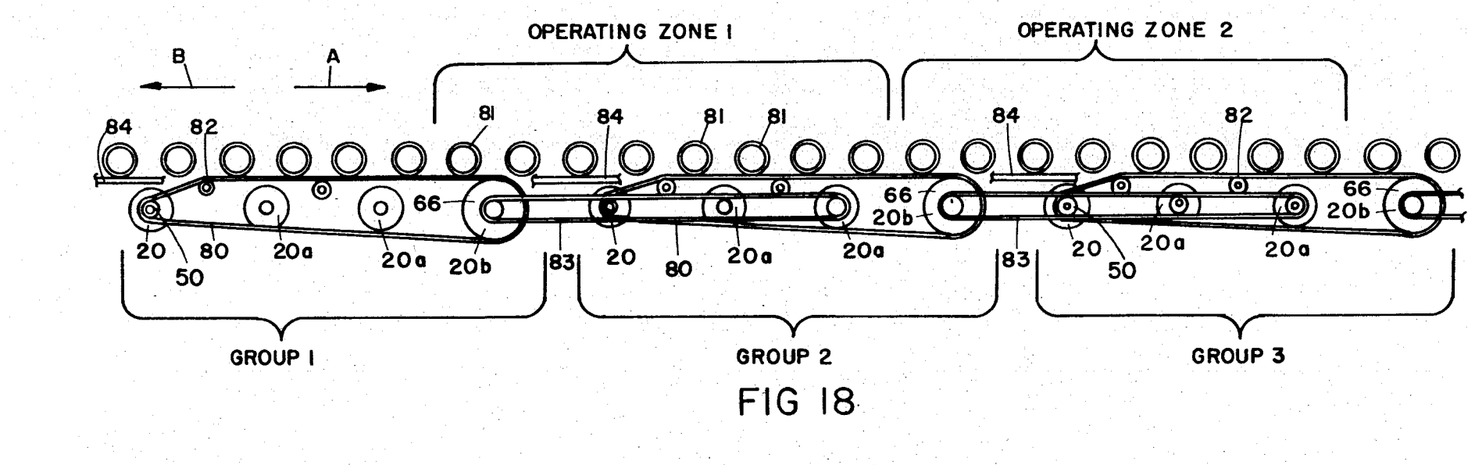
FIG. 18 is a schematic view illustrating the operation of the invention.

As is best seen in FIGS. 3 and 18, each operating group has a sensing belt 80. The downstream end of the sensing belt 80 passes over the idler pulley 50 of the downstream support unit 20. Because the idler pulley 50 is of reduced diameter, the sensor belt 80 makes no contact with the conveyor roller 81 which is immediately upstream of the support unit 20. The sensing belt passes over and drives pulley 66 of the upstream support unit 20b. By virtue of the guide pulleys 82, upstream of the support unit 20 and between the intermediate support units 20a, the sensing belt 80 is held in contact with the conveyor rollers 81 above the two intermediate support units 20a (FIGS. 3 and 6).

In addition to the sensing belt 80, each group also has a plurality of secondary driving belts 83. Each secondary belt 83 provides driving interconnection between a pair of the inner wheel couples 22 of two adjacent support units. The secondary belts 83 are trained over the sprocket pulleys 26 and 26a at the center of the wheel couples 22. One secondary belt, for example, will interconnect the inner wheel couple of support unit 20 and the inner wheel couple of the adjacent intermediate support unit 20a. This belt is seated in the adjacent pulley sprocket to that for the belt interconnecting the intermediate support units 20a. In this manner, four of the support units are positively interconnected for simultaneous operation. The secondary drive belts 83 interconnect support unit 20b of the preceding downstream operating group with the downstream support unit 20 and the two intermediate support units 20a of the next upstream operating group. These belts tie these units together for simultaneous operation.

The four support units interconnected by the secondary drive belts form an operating zone. It will be observed from FIG. 18 that an operating zone overlaps portions of two operating groups. The difference between the two is that the operating group controls the sensing to which the next upstream operating zone responds. The operating zone is the area of accumulation because it is the area in which the conveyor rollers 81 are released from the primary drive belt 84.

Referring to FIGS. 3 and 18, for the purpose of this explanation it is assumed that all wheels of the support units 20 and 20a of group 1 have been caused to assume an accumulation mode, interrupting drive between the primary belt 84 and the conveyor rollers 81 above these units. Assuming the primary drive belt 84 is moving in the direction of the arrow A, and thus the articles are moving in the direction of the arrow B, an article entering group 1 will become stalled above the downstream support unit 20 and intermediate support units 20a of group 1. The presence of the article will stall the conveyor rollers 81 on which it rests.

Prior to the article becoming stalled, the rollers 81 above the support units 20a, while disengaged from the primary conveyor belt 84 were free to rotate and, therefore, imposed no braking effect upon the sensing belt 80. The stalled rollers will render the group 1 sensing belt 80 stationary and hold it stationary. This, in turn, will stall the wheels of the downstream and intermediate support units of the upstream operating group 2 causing the wheels of all four of the secondary belt interconnected supporting units, including the three in group 2, to adjust to accumulation mode. The driving connection between the primary belt 84 and the conveyor rollers 81 above these supporting units will be interrupted. However, so long as no article is resting on these conveyor rollers, they are free to turn and, therefore, will not impose any restraint upon the continued movement of the sensing belt 80 of group 2. The sensing belt 80 of group 2 will continue to operate, driven by the support unit 20b of group 2 and by the support units 20 and 20a of group 3 because of the interconnection created by the secondary belts 83.

When the next article enters operating zone 1 it will continue to be conveyed until it contacts and is stalled by the article in the upstream zone ahead, above the intermediate support units of group 1. Its movement to this point is assured because the conveyor rollers 81 in operating zone 1 will continue to be driven by the sensing belt 80 of group 2 with power derived from operating group 3. However, as soon as the article becomes stalled in operating zone 1, this will stall sensing belt 80 of group 2 and initiate the shift of the support units in operating zone 2 to accumulation mode. This process will continue to be repeated upstream as more articles continue to be accumulated.

When the support units shift to accumulation mode, the primary belt 84 drops because the rests 70 of all the wheels become aligned, facing upwardly. When the sensing belt of group 1 stalls, the couple 23 of support unit 20b will continue to turn under the drive of the primary belt 84 until the rest 70 of the wheel portion 61 is uppermost. It will then stall due to lack of driving contact with the primary belt 84 and the braking effect of the sensing belt 80. The inner wheel couple 22 will continue to rotate due to contact with the primary belt 84 until the rests 70 of the wheels 23 and 24 have shifted to the top. At this point, not only will contact with the primary belt 84 be greatly reduced or eliminated, the clutch finger 34 will contact one of the stops 65. This will apply the braking effect of the sensing belt to the inner wheel couple. The remaining outer wheel 40 will continue to turn until its rest 70 is uppermost, at which point, the clutch finger 33 will engage one of the stops 49. In this manner the rests 70 of all of the wheels of the support unit will be aligned and under the braking control of the stalled sensing belt.

It is important when the supporting units are installed that all of the inner wheel couples 22 which are connected by secondary belts 80 as an operating unit have their rests 70 located in the same circumferential position. When the inner wheel couple 22 of the upstream support unit of a group stalls in accumulation mode, the inner wheel couples 22 of the interconnected support units also stall in exactly the same circumferential position. Because this is necessary and no slippage or creep can be tolerated, the secondary belts 83 have teeth which engage the teeth 88 of the sprockets 26 and 26a (FIGS. 10 and 17).

When the block is removed permitting the lead downstream article to resume movement, assuming at least one conveyor roller beneath the article has remained under power or some other means is provided which initiates article movement, the initial movement of the article will reestablish rotation of the conveyor rollers on which it is resting. This will activate the sensing belt 80 of group 1. A very small movement of the sensing belt 80 will result in rotating the inner wheel couple of support unit 20b of group 1 and the inner wheel couples of support units 20 and 20a of group 2 into driving contact with the primary belt 84. As soon as this occurs, full conveying effect will be restored to operating zone 1. This will activate the sensing belt 80 of group 2 which will, in the same manner, initiate restoration of conveying mode in operating zone 3. This process will be repeated upstream until conveying mode is once more restored to the entire accumulator.

In returning the support units to conveying mode, the lost motion clutches between the inner wheel couples and the outer wheels permit the inner wheel couples to shift out-of-phase with the outer wheels before the outer wheels start rotating. This restores the support units to forming circular support surface to the primary belt 84.

The outer wheels 40 and 41, the inner wheel couple 25 and the coupling member 60 are all preferably molded from a suitable plastic material such as Delrin, an acetal resin manufactured by E. I. du Pont de Nemoirs & Co. The use of this material provides parts which do not require lubrication and operate at a very reduced noise level.

Figure 19:
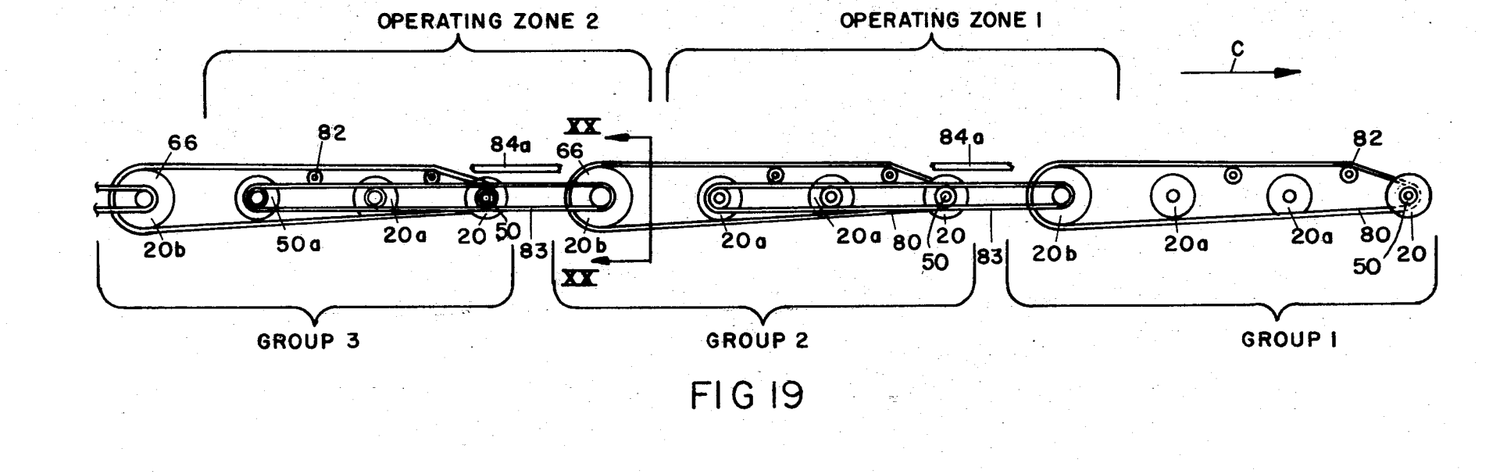
FIG. 19 is a schematic view illustrating the invention applied to a wheel conveyor.

FIGS. 19 and 20 illustrate this invention applied to a wheel conveyor as contrasted to its application to a powered roller conveyor. In the following description those components which are identical to the structure illustrated in FIGS. 1 through 18 are identified by the same number. In this type of conveyor, the powered belt 84a is preferably located in a median and generally centered between the side frame members 11 of the conveyor. When the belt is raised into conveying mode, its top surface is co-planar with or slightly above the article supporting surface of the rollers 100 which flank it on each side. When the belt 84a is shifted to accumulation mode, it is lowered beneath this plane sufficiently to disengage articles seated on the rollers 100.

The arrangement of the mechanism for accomplishing the mode shift is quite similar to that illustrated in FIG. 18 with the several support units 20, 20a and 20b being arranged in the same relationship with respect to the direction of movement of the articles. However, they are reversed with respect to the direction of movement of the belt 84a. This becomes clear by comparing FIGS. 18 and 19 in which the direction of travel of the belt (Arrow C in FIG. 19) remains the same but in the FIG. 19 construction, the articles travel with the belt rather than oppositely to it. It will be observed that the arrangement of the support units in each group is turned end-for-end with respect to the belt travel. The other difference is that the sensing belts are positioned to contact the articles rather than the article support rollers and are, therefore, co-planar with the tops of the rollers 100.

The operation of the modified construction is the same as that of the construction illustrated in FIGS. 1–18. An article stalled on the rollers of group 1 will stall the sensing belt 80 of that group which will terminate drive through pulley 66 to the secondary drive belt 83 interconnecting it to the support units 20 and 20a of the next upstream group. This arrangement is repeated along the entire portion of the conveyor designed to function as an accumulator.

The invention has the advantage of high throughput rates. Thus, for a given volume of articles being transported, a slower belt speed can be employed. This is advantageous not only from an energy requirement standpoint but also because it contributes significantly to noise reduction. Elimination of the conventional sensors which are tripped by the passing articles in conventional accumulators also contributes to noise reduction. When in the conveying mode, it operates continuously and no portion of the mechanism shifts to accumulation unless an article is actually stalled on the conveyor. This reduces wear and noise and it permits continuous and uniform application of movement to the articles.

Having described a preferred embodiment of the invention and its operation, it will be understood that various modifications of the invention can be made without departing from the principles thereof. Such modifications are to be considered as included in the hereinafter appended claims unless these claims by their language expressly state otherwise.

The embodiments of the invention in which an exclusive property or privilege is claimed are defined as follows:

1. An article conveyor and accumulator having a plurality of rotatable article supporting elements forming an article conveying surface, a powered belt for propelling articles along said conveying surface, a plurality of support units supporting said powered belt from beneath, said support units being arranged in groups lengthwise of said conveyor, an article motion sensing and transmitting means for each group responsive to the movement of an article superimposed above it and drivingly connected to the support units of the next upstream group; said support units of said next upstream group holding the powered belt in raised article propelling position when said motion sensing and transmitting means is in motion and lowering the powered belt into accumulation position when said motion transmitting means is stationary.

2. An article conveyor and accumulator as described in claim 1 further characterized in that said elements are wheels and said powered belt contacts the articles on said conveying surface.

3. An article conveyor and accumulator as described in claim 1 further characterized in that said elements are rollers and said powered belt contacts said rollers from beneath.

4. An article conveyor and accumulator having a plurality of rollers forming an article conveying surface, a powered belt for driving said rollers, a plurality of support units supporting said powered belt from beneath, said support units being arranged in groups lengthwise of said conveyor, an article motion sensing and transmitting means for each group having a motion transmitting connection with an article above one group and drivingly connected to the support units of the next upstream group; said support units of said next upstream group holding the powered belt in raised drive position when said motion sensing and transmitting means is in motion and lowering the powered belt into accumulation position when said motion transmitting means is stationary.

5. An article conveyor and accumulator as described in claim 4 further characterized in that said sensing and transmitting means is a belt, said sensing and transmitting belt being positioned at one side of, parallel to said powered belt and co-planar with said article conveying surface and said support units, when in transport mode, supporting said powered belt co-planar with said transport surface.

6. An article conveyor and accumulator as described in claim 5 further characterized in that each of said groups has two intermediate guide pulleys and said guide pulleys hold said sensing and transmitting belt co-planar with said surface adjacent both of said intermediate support units.

7. An accumulator conveyor having a plurality of rollers forming an article transporting and accumulating surface and a primary drive belt; a plurality of support units beneath said belt; each of said support units having belt contacting means adjustable between conveying and accumulation modes; said adjustable contacting means in conveying mode supporting said belt in raised article propelling position and in accumulation mode lowering said belt to non-propelling, disengagement position; said support units being arranged in groups, said accumulator characterized in that each group has an upstream, intermediate and downstream support unit; each group having a sensing belt connected to said upstream support unit, means holding said sensing belt 45 in motion transmitting relationship adjacent said intermediate support unit; a secondary drive element operatively interconnecting the upstream support unit of each group with the downstream and intermediate support units of the next upstream group, when an article in motion transmitting relationship to said sensing belt is stalled, said sensing belt shifting all of the support units interconnected by said secondary drive element to accumulation mode.

8. An accumulator conveyor having a plurality of rollers forming an article transporting and accumulating surface and a primary drive belt for propelling articles along said surface; a plurality of support units beneath said belt; each of said support units having belt contacting means adjustable between conveying and accumulation modes; said belt contacting means in conveying mode supporting said belt in raised article propelling position and in accumulation mode lowering said belt to non-propelling disengagement position; said support units being arranged in groups, said accumulator characterized in that each group has an upstream, intermediate and downstream support unit; each group having an article motion sensing belt connected to said upstream support unit, said belt being motion responsive to articles situated over said intermediate support; a secondary drive element operatively interconnecting the upstream support unit of each group with the downstream and intermediate support units of the next upstream group, when said sensing belt responds to a stationary article over said intermediate support unit, said sensing belt shifting all of the support units interconnected by said secondary drive element to accumulation mode.

9. An accumulator conveyor as described in claim 8 further characterized in that said belt contacting means is a plurality of wheels each having a flattened rest portion on its periphery, said wheels being rotatably mounted on a common axle; the rest portions of said wheels being misaligned when said belt contacting means is in conveying mode and aligned when said belt contacting means is in accumulation mode, lost motion clutches connecting said wheels.

10. An accumulator conveyor having a plurality of rollers forming an article transporting and accumulating surface and a primary drive belt driving said rollers from beneath; a plurality of support units beneath said belt; each of said support units having belt contacting means adjustable between conveying and accumulation modes; said adjustable contacting means in conveying mode supporting said belt in roller contacting position and in accumulation mode lowering said belt to disengage said rollers; said support units being arranged in groups, said accumulator characterized in that each group has an upstream, intermediate and downstream support unit; each group having a sensing belt connected to said upstream support unit, means holding said sensing belt in contact with said rollers adjacent said intermediate support unit; a secondary drive element operatively interconnecting the upstream support unit of each group with the downstream and intermediate support units of the next upstream group, when the rollers contacting said sensing belt are stalled, said sensing belt shifting all of the support units interconnected by said secondary drive element to accumulation mode.

11. An accumulator conveyor as described in claim 10 further characterized in that said sensing belt is positioned at one side of and parallel to said drive belt.

12. An accumulator conveyor as described in claim 10 further characterized in that an idler pulley is mounted on the downstream support unit of each group, the downstream end of said sensing belt passing around said idler pulley, said sensing belt at said idler pulley being disengaged from said rollers.

13. An accumulator conveyor as described in claim 10 further characterized in that each of said groups has two intermediate support units and said holding means holds said sensing belt in contact with said rollers adjacent both of said intermediate support units.

14. An accumulator conveyor as described in claim 10 further characterized in that said adjustable means is a plurality of wheels each having a flattened rest portion on its periphery, said wheels being rotatably mounted on a common axle; the rest portions of said wheels being misaligned when said adjustable means is in conveying mode and aligned when said adjustable means is in accumulation mode, lost motion clutches connecting said wheels.

15. An accumulator conveyor as described in claim 14 further characterized in that said wheels include an integral intermediate wheel pair and a pair of outer wheels, one at each end of said intermediate wheel pair, the rests of all of the intermediate wheel pairs interconnected by said secondary drive element being aligned in the identical circumferential position.

16. An accumulator conveyor as described in claim 14 further characterized in that said clutches connect said outer wheels to said intermediate wheel pair.

17. An accumulator having a plurality of rollers forming an article conveying surface, a powered belt for driving said rollers, a plurality of support units supporting said powered belt from beneath, said support units being arranged in groups lengthwise of said conveyor, a roller motion sensing and transmitting means for each group in contact with the rollers above one group and drivingly connected to the support units of the next upstream group; said support units holding the powered belt in raised drive position when said motion transmitting means is in motion and lowering the powered belt into accumulation position when said motion transmitting means is stationary.

18. An accumulator conveyor having a plurality of rollers forming an article transporting and accumulating surface and a primary drive belt driving said rollers from beneath; a plurality of support units beneath said belt; each of said units having a plurality of wheels, each wheel having a flattened area of reduced radius, the wheels of said units supporting said belt in roller contacting position when misaligned and lowering said belt to disengage said rollers when said wheels are aligned; said support units being arranged in groups, each group having an upstream, intermediate and downstream unit; each group having a sensing belt connected to said upstream unit, means holding said sensing belt in contact with said rollers adjacent said intermediate unit; a secondary drive element interconnecting the upstream unit of each group with the downstream and intermediate units of the next upstream group, when the rollers contacting said sensing belt are stalled said sensing belt shifting all of the units interconnected by said secondary drive element to accumulation mode.

19. An accumulator conveyor having a plurality of rollers forming an article transporting and accumulating surface and a primary drive belt driving said rollers from beneath; said operating surface being divided in a plurality of zones arranged in tandem; a plurality of support units beneath said belt; each of said support units having belt contacting means adjustable between conveying and accumulation modes; said adjustable means in conveying mode supporting said belt in roller contacting position and in accumulation mode lowering said belt to disengage said rollers; said support units being arranged in groups, each group having an upstream, intermediate and downstream unit; the upstream support unit of one group together with the downstream and intermediate support units of the adjacent upstream group defining one of said operating zones; each group having a sensing belt; means holding said sensing belt in contact with said rollers adjacent the intermediate support unit for said group; a secondary drive element interconnecting the support units of each operating zone, said sensing belt operatively connected to the support units of the adjacent upstream operating zone; said sensing belt, when the rollers contacting said sensing belt are stalled, shifting all of the units interconnected by said secondary drive element to accumulation mode.

20. An accumulator having a plurality of conveyor rollers forming an article conveying surface, a powered primary belt for driving said rollers from beneath for moving articles downstream opposite to the direction of movement of said belt, a plurality of support units supporting said primary belt from beneath, each of said units having a pair of inner wheels and a pair of outer wheels mounted on a common shaft and each having a flattened peripheral rest area, lost motion connections between said inner wheels and said outer wheels permitting the flattened surfaces of all wheels to be aligned or misaligned whereby the wheels, when misaligned, collectively form a circular primary belt supporting surface, said support units being arranged in groups along said conveyor, said accumulator characterized in that an endless sensing member is connected to the last upstream support unit of each group and extends downstream therefrom in fixed driven contact with at least some of the conveyor rollers above said group; said sensing member being beside and parallel to said primary belt; endless means interconnecting for simultaneous rotation the inner wheels of all but the last upstream one of the support units of each group with the last upstream drive unit of the next downstream group; the flattened surfaces of all connected inner wheels being identically positioned; said lost motion connections permitting said inner and outer wheels to assume misaligned, circular belt supporting relationship and when said sensing member is braked by said conveyor rollers, said inner and outer wheels will be caused to assume an in-phase relationship permitting said belt to drop into accumulation position.

* * * * *

UNITED STATES PATENT AND TRADEMARK OFFICE
CERTIFICATE OF CORRECTION

PATENT NO. : 4,361,224

DATED : November 30, 1982

INVENTOR(S) : Clyde Bowman

It is certified that error appears in the above-identified patent and that said Letters Patent is hereby corrected as shown below:

Column 9, line 46:

After "relationship" add --to articles on said transporting and accumulating surface--

Signed and Sealed this

Twenty-ninth Day of March 1983

[SEAL]

Attest:

GERALD J. MOSSINGHOFF

Attesting Officer     Commissioner of Patents and Trademarks